(12) United States Patent
Xia et al.

(10) Patent No.: US 11,503,580 B2
(45) Date of Patent: Nov. 15, 2022

(54) METHOD AND DEVICE FOR CONFIGURING PHYSICAL DOWNLINK CONTROL CHANNEL TIME DOMAIN MONITORING POSITION

(71) Applicants: China Mobile Communication Co., Ltd Research Institute, Beijing (CN); China Mobile Communications Group Co., Ltd., Beijing (CN)

(72) Inventors: Liang Xia, Beijing (CN); Xueying Hou, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 51 days.

(21) Appl. No.: 17/055,650

(22) PCT Filed: Apr. 17, 2019

(86) PCT No.: PCT/CN2019/083015
§ 371 (c)(1),
(2) Date: Nov. 16, 2020

(87) PCT Pub. No.: WO2019/223458
PCT Pub. Date: Nov. 28, 2019

(65) Prior Publication Data
US 2021/0235426 A1    Jul. 29, 2021

(30) Foreign Application Priority Data
May 23, 2018    (CN) .......................... 201810504095.9

(51) Int. Cl.
*H04W 4/00* (2018.01)
*H04W 72/04* (2009.01)

(52) U.S. Cl.
CPC ..... *H04W 72/042* (2013.01); *H04W 72/0446* (2013.01)

(58) Field of Classification Search
CPC .......... H04W 72/042; H04W 72/0446; H04W 72/1289; H04W 24/08
See application file for complete search history.

(56) References Cited

U.S. PATENT DOCUMENTS 11,265,128 B2 * 3/2022 Xu ........................ H04L 5/0053
2016/0249337 A1 * 8/2016 Liang ................ H04W 72/0406
(Continued)

FOREIGN PATENT DOCUMENTS

WO    2018056339 A1    3/2018

OTHER PUBLICATIONS

"Discussion on remaining issues for search space," R1-1802040, 3GPP TSG RAN WG1 Meeting #92, CMCC, Athens, Greece, Feb. 26-Mar. 2, 2018, 13 pages.
(Continued)

*Primary Examiner* — Abdelnabi O Musa
(74) *Attorney, Agent, or Firm* — Price Heneveld LLP

(57) ABSTRACT

A method and device for configuring a PDCCH time domain monitoring position are provided. The method includes: receiving PDCCH search space configuration signaling, wherein the PDCCH search space configuration signaling includes a PDCCH monitoring periodicity, a PDCCH monitoring offset, and indication signaling for indicating the starting position of a first symbol in which a PDCCH is located; and determining a time domain position for monitoring the PDCCH according to the PDCCH search space configuration signaling.

16 Claims, 6 Drawing Sheets

(56) References Cited

U.S. PATENT DOCUMENTS

| | | | |
|---|---|---|---|
| 2017/0094643 A1* | 3/2017 | Park | H04L 5/0053 |
| 2019/0297603 A1* | 9/2019 | Guo | H04W 72/046 |
| 2019/0306700 A1* | 10/2019 | Lin | H04W 76/11 |
| 2019/0313383 A1* | 10/2019 | Xiong | H04W 16/14 |
| 2019/0349180 A1* | 11/2019 | Lu | H04L 27/2607 |
| 2020/0029307 A1 | 1/2020 | Takeda et al. | |
| 2020/0068599 A1* | 2/2020 | Yang | H04L 5/0057 |
| 2021/0045144 A1* | 2/2021 | Kim | H04W 72/0446 |
| 2021/0050936 A1* | 2/2021 | Seo | H04L 5/0053 |

OTHER PUBLICATIONS

"Misalignment of CSS in PBCH and dedicated signaling," R2-1804882, 3GPP TSG-RAN WG2 Meeting #101 bis, vivo, Sanya, China, Apr. 16-20, 2018, 8 pages.

NTT Docomo, Inc, "Offline summary for AI 7.1.3.1.2 Search space", 3GPP TSG RAN WG1 Meeting #93, R1-1807638, Busan, Korea, May 21-25, 2018.

* cited by examiner

Transmitting PDCCH search space configuration signaling, wherein the PDCCH search space configuration signaling includes a search space identifier, and the search space identifier is search space configuration information greater than or equal to x, wherein x is an integer greater than 0, and a search space with a search space identifier of 0 corresponds to a Type0-PDCCH search space ⸺41

Fig. 4

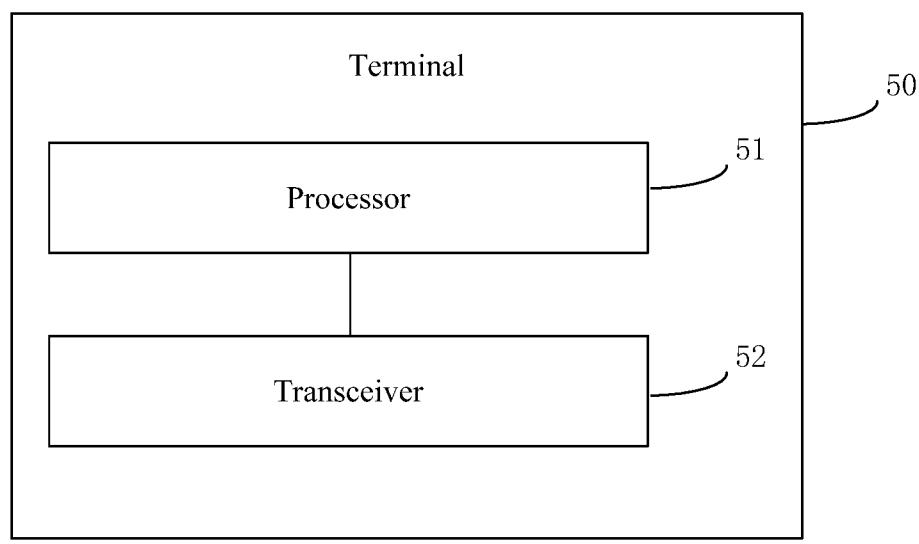

Fig. 5

METHOD AND DEVICE FOR CONFIGURING PHYSICAL DOWNLINK CONTROL CHANNEL TIME DOMAIN MONITORING POSITION

CROSS-REFERENCE TO RELATED APPLICATION

The present application is a U.S. national phase application of a PCT Application No. PCT/CN2019/083015 filed on Apr. 17, 2019, which claims a priority to Chinese Patent Application No. 201810504095.9 filed in China on May 23, 2018, a disclosure of which are incorporated in its entirety by reference herein.

TECHNICAL FIELD

The present disclosure relates to the field of communication technology, and in particular to a method and device for configuring a physical downlink control channel (PDCCH) time domain monitoring position.

BACKGROUND

In the design standards of fifth-generation (5G) New Radio (NR) mobile communication systems, a PDCCH monitoring occasion is notified by a base station to user equipment (UE) through radio resource control (RRC) signaling. The RRC signaling includes a periodicity, an offset, and a bitmap indication. The periodicity K is in units of slot, and a value range of the periodicity K is $\{1, 2, 4, 5, 8, 10, 16, 20\}$. The offset O has a value in units of slot, and the value range is 0 to K−1. The bitmap has a length of 14, wherein each bit corresponds to one symbol in a slot in which the PDCCH monitoring occasion is located. If a bit is 1, it represents that a symbol corresponding to the bit is a first symbol for PDCCH monitoring. The slot in which the PDCCH monitoring occasion is located meets the following condition:

$$(n_f \cdot N_{slot}^{frame,\mu} + n_{s,f}^{\mu} - O) \bmod K = 0,$$

where $n_f$ is a radio frame number, $N_{slot}^{frame,\mu}$ is a quantity of slots included in one radio frame, $n_{s,f}^{\mu}$ is a number of a slot in one radio frame, and the value of u falls within $\{0, 1, 2, 3\}$ and is associated with a subcarrier spacing.

For a Type0-PDCCH (a PDCCH used for carrying remaining minimum system information (RMSI) scheduling signaling), a monitoring occasion is determined from a synchronization signal block (SSB) number and master information block (MIB) signaling transmitted by a base station. For example, corresponding to the SSB and control resource set (CORESET) multiplexing pattern 1, UE monitors Type0-PDCCH over an $n_{0\ th}$ slot in a radio frame with a number of $SFN_C$ and an immediate following slot, where $SFN_C$ and $n_0$ meet the following conditions:

$$n_0 = (O \cdot 2^{\mu} + \lfloor i \cdot M \rfloor) \bmod N_{slot}^{frame,\mu},$$

$SFN_C \bmod 2 = 0$ if $\lfloor (O \cdot 2^{\mu} + \lfloor i \cdot M \rfloor) / N_{slot}^{frame,\mu} \rfloor \bmod 2 = 0,$ $SFN_C \bmod 2 = 1$ if $\lfloor (O \cdot 2^{\mu} + \lfloor i \cdot M \rfloor) / N_{slot}^{frame,\mu} \rfloor \bmod 2 = 1,$ where i is an SSB number, and M and O are determined according to MIB signaling. Further, the position of a first symbol for the Type0-PDCCH in the slots for Type0-PDCCH monitoring is also determined from MIB signaling.

For the SSB and CORESET multiplexing patterns 2 and 3, a Type0-PDCCH monitoring periodicity of UE is the same as the SSB periodicity. The slots for Type0-PDCCH monitoring and the position of the first symbol in the slots for Type0-PDCCH monitoring are determined according to a predefined table. Generally, the slots for Type0-PDCCH monitoring are a slot in which an $i^{th}$ SSB is located or the aforementioned $n_{0\ th}$ slot in a radio frame with a number of $SFN_C$ and an immediate following slot.

For the SSB and CORESET multiplexing pattern 1, a periodicity of Type0-PDCCH slots is two radio frames, that is, 20 ms. For the SSB and CORESET multiplexing patterns 2 and 3, the periodicity of Type0-PDCCH slots is the SSB periodicity, that is, $\{5, 10, 20, 40, 80, 160\}$ ms.

In RMSI (also referred to as system information block 1 (SIB1)) signaling, the base station may configure, through RRC signaling, a PDCCH search space (including a time domain monitoring position) for UE to monitor RMSI scheduling signaling. In the foregoing description, a maximum PDCCH monitoring periodicity configured through the RRC signaling is 20 slots, while a maximum Type0-PDCCH monitoring periodicity is 160 ms, which corresponds to $160 \cdot 2^{\mu}$ slots. In addition, the slots for Type0-PDCCH monitoring may be two consecutive slots, while only one slot can be configured through the RRC signaling.

Therefore, RRC signaling cannot accurately and completely describe a Type0-PDCCH time domain monitoring occasion.

SUMMARY

The present disclosure provides a method and device for configuring a PDCCH time domain monitoring position, to resolve the problem that RRC signaling cannot accurately and completely describe a Type0-PDCCH time domain monitoring occasion.

A method for configuring a PDCCH time domain monitoring position is applied to a terminal and includes:

receiving PDCCH search space configuration signaling, wherein the PDCCH search space configuration signaling includes a PDCCH monitoring periodicity, a PDCCH monitoring offset, and indication signaling for indicating a starting position of a first symbol in which a PDCCH is located; and determining a time domain position for monitoring the PDCCH according to the PDCCH search space configuration signaling.

The present disclosure further provides in some embodiments a method for configuring a PDCCH time domain monitoring position. The method is applied to a base station and includes:

transmitting PDCCH search space configuration signaling, wherein the PDCCH search space configuration signaling includes a PDCCH monitoring periodicity, a PDCCH monitoring offset, and indication signaling for indicating a starting position of a first symbol in which a PDCCH is located.

The present disclosure further provides in some embodiments a method for configuring a PDCCH time domain monitoring position. The method is applied to a base station and includes:

transmitting PDCCH search space configuration signaling, wherein the PDCCH search space configuration signaling includes a search space identifier, and the search space identifier is search space configuration information greater than or equal to x, wherein x is an integer greater than 0, and a search space with a search space identifier of 0 corresponds to a Type0-PDCCH search space.

The present disclosure further provides in some embodiments a terminal. The terminal includes a processor and a transceiver, wherein the transceiver is configured to receive PDCCH search space configuration signaling, wherein the PDCCH search space configuration signaling includes a PDCCH monitoring periodicity, a PDCCH monitoring offset, and indication signaling for indicating a starting position of a first symbol in which a PDCCH is located; and the processor is configured to determine a time domain position for monitoring the PDCCH according to the PDCCH search space configuration signaling.

The present disclosure further provides in some embodiments a base station. The base station includes a processor and a transceiver, wherein the transceiver is configured to transmit PDCCH search space configuration signaling, the PDCCH search space configuration signaling includes a PDCCH monitoring periodicity, a PDCCH monitoring offset, and indication signaling for indicating the starting position of a first symbol in which a PDCCH is located.

The present disclosure further provides in some embodiments a base station. The base station includes a processor and a transceiver, wherein the transceiver is configured to transmit PDCCH search space configuration signaling, the PDCCH search space configuration signaling includes a search space identifier, the search space identifier is search space configuration information greater than or equal to x, wherein x is an integer greater than 0, and a search space with a search space identifier of 0 corresponds to a Type0-PDCCH search space.

The present disclosure further provides in some embodiments a communication device, including a processor and a storage storing a computer program, wherein the processor is configured to execute the computer program to implement the foregoing method.

The present disclosure further provides in some embodiments a computer-readable storage medium, including instructions, wherein the instructions are configured to be executed by a computer to perform the foregoing method.

The foregoing technical solutions in the embodiments of the present disclosure have following beneficial effects: a PDCCH monitoring occasion is notified to a terminal through PDCCH search space configuration signaling, and the PDCCH search space configuration signaling includes a PDCCH monitoring periodicity, a PDCCH monitoring offset, and indication signaling for indicating a starting position of a first symbol in which a PDCCH is located, so that a PDCCH time domain monitoring position may be determined through the PDCCH search space configuration signaling, thereby a Type0-PDCCH time domain monitoring occasion may be completely described.

BRIEF DESCRIPTION OF THE DRAWINGS

To describe the technical solutions of the embodiments of the present disclosure more clearly, the following briefly describes the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

FIG. 4 is another schematic flowchart of a method for configuring a PDCCH time domain monitoring position on a base station side according to an embodiment of the present disclosure;

FIG. 5 is a schematic structural diagram of a terminal according to an embodiment of the present disclosure;

DETAILED DESCRIPTION

Figure 1:
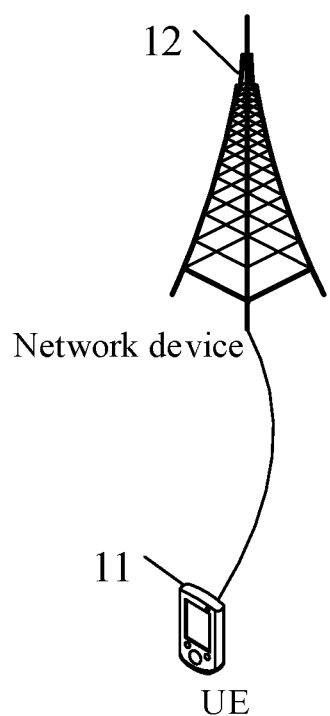
FIG. 1 is a block diagram of a wireless communication system to which embodiments of the present disclosure are applicable.

The exemplary embodiments of the present disclosure will be more specifically described below with reference to the accompanying drawings. The exemplary embodiments of the present disclosure are shown in the accompanying drawings. However, it should be understood that the present disclosure may be implemented in various forms, and should not be construed as being limited to the embodiments set forth herein. Rather, these embodiments are provided so that the present disclosure will be understood more thoroughly, and can fully convey the scope of the present disclosure to a person skilled in the art.

The terms such as "first" and "second" in the description and claims of the present disclosure are only used to distinguish between similar objects, but are not used to describe a specific order or time sequence. It should be understood that the data thus used are interchangeable in appropriate circumstances so that the embodiments of the present disclosure described herein, for example, can be implemented in other sequences than those illustrated or described. In addition, the terms "include", "have", and any variation of such terms are intended to cover a non-exclusive inclusion. For example, a process, method, system, product or device that includes a series of steps or units not only includes those steps or units specified expressly, but also includes other steps or units that are not specified expressly or are inherent in the process, method, system, product or device. The term "and/or" in the description and claims represents at least one of associated objects.

The technology described herein is not limited to a Long Term Evolution (LTE) system/an LTE-Advanced (LTE-A) system, and may also be applied to various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are often used interchangeably. The CDMA system may implement radio technologies such as CDMA2000 and Universal Terrestrial Radio Access (UTRA). The UTRA includes Wideband Code Division Multiple Access (WCDMA) and other CDMA variants. The TDMA system may implement radio technologies such as a Global System for Mobile Communication (GSM). The OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. The UTRA and the E-UTRA are parts of Universal Mobile Telecommunications System (UMTS). The LTE and more advanced LTE (for example, LTE-A) are new UMTS versions using E-UTRA. The UTRA, E-UTRA, UMTS, LTE, LTE-A, and GSM are described in the documents from an organization named "Third Generation Partnership Project (3GPP)". The CDMA2000 and the UMB are described in the documents from an organization named "Third Generation Partnership Project 2 (3GPP2)". The technology described herein may be applied to the systems and radio technologies mentioned above, and may also be applied to other systems and radio technologies. Although an NR system is described below for exemplary purpose, and NR terms are used in most of the following description, these technologies may also be applied to applications other than an NR system application.

The following description provides examples and does not limit the scope, applicability or configuration set forth in the claims. Changes may be made to the functions and arrangements of the described elements without departing from the spirit and scope of the present disclosure. Various processes or components may be appropriately omitted, replaced or added in various examples. For example, the described method may be performed in a sequence different from the described sequence, and various steps may be added, omitted or combined. In addition, features described with reference to some examples may be combined in other examples.

Referring to FIG. 1, FIG. 1 is a block diagram of a wireless communication system to which embodiments of the present disclosure are applicable. The wireless communication system includes UE 11 and a network device 12. The UE 11 may also be referred to as a terminal or a user terminal. The UE 11 may be a terminal side device such as a mobile phone, a tablet personal computer, a laptop computer, a personal digital assistant (PDA), a mobile internet device (MID), a wearable device or an in-vehicle device. It needs to be noted that the specific type of the UE 11 is not limited in the embodiments of the present disclosure. The network device 12 may be a base station and/or a core network network element. The base station may be a base station of 5G or a later version (for example, a gNB or a 5G NR NB) or a base station in another communication system (for example, an evolved NodeB (eNB), a wireless local area network (WLAN) access point or another access point). The base station may be referred to as a node B, an evolved node B, an access point, a base transceiver station (BTS), a radio base station, a radio transceiver, a basic service set (BSS), an extended service set (ESS), a nodeB, an eNB, a home nodeB, a home evolved nodeB, a WLAN access point, a WiFi node or another appropriate term in the field. Provided that the same technical effect is achieved, the base station is not limited to a specific technical term. It needs to be noted that only a base station in an NR system is used as an example in the embodiments of the present disclosure. However, the specific type of the base station is not limited.

The base station may communicate with the UE 11 under the control of a base station controller. In various examples, the base station controller may be a part of a core network or some base stations. Some base stations may perform communication of control information or user data with a core network by using a backhaul link. In some examples, some of these base stations may directly or indirectly communicate with each other by using a backhaul link. The backhaul link may be a wired or wireless communication link. The wireless communication system may support the operation on a plurality of carriers (waveform signals with different frequencies). A multi-carrier transmitter can transfer modulated signals on the plurality of carriers at the same time. For example, each communication link may be multi-carrier signals modulated according to various radio technologies. Each modulated signal may be transmitted on different carriers and may carry control information (for example, a reference signal, and a control channel), overhead information, data, and the like.

The base station may perform wireless communication with the UE 11 via one or more access point antennas. Each base station may provide communication coverage for respective coverage area. The coverage area of the access point may be divided into sectors that each only constitutes a part of the coverage area. The wireless communication system may include different types of base stations (for example, a macro base station, a micro base station or a pico base station). The base station may also use different radio technologies such as cellular or WLAN radio access technologies. The base station may be correlated to the same or different access networks or operator deployments. The coverage areas of different base stations (including coverage areas of the same type or different types of base stations, coverage areas using the same radio technology or different radio technologies, or coverage areas that belong to the same access network or different access networks) may overlap.

The communication link in the wireless communication system may include an uplink (UL) used for carrying UL transmission (for example, from the UE 11 to the network device 12) or a downlink (DL) used for carrying DL transmission (for example, from the network device 12 to the UE 11). UL transmission may also be referred to as reverse link transmission, and DL transmission may also be referred to as forward link transmission. The DL transmission may be performed by using a licensed band, an unlicensed band or both. Similarly, the UL transmission may be performed by using a licensed band, an unlicensed band or both.

Figure 2:
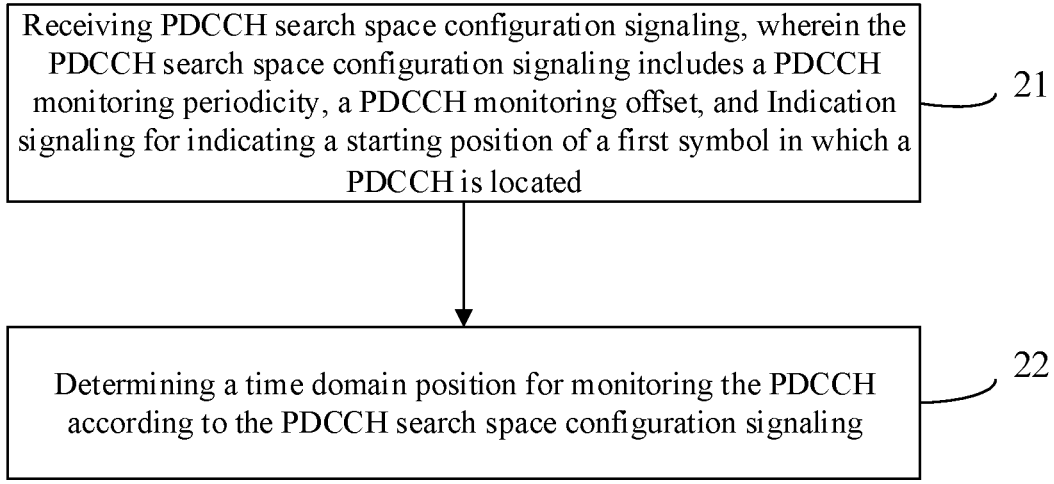
FIG. 2 is a schematic flowchart of a method for configuring a PDCCH time domain monitoring position on a terminal side according to an embodiment of the present disclosure.

Referring to FIG. 2, the present disclosure further provides in an embodiment a method for configuring a PDCCH time domain monitoring position. The method is applied to a terminal and includes the following steps.

A step 21 includes: receiving PDCCH search space configuration signaling, wherein the PDCCH search space configuration signaling includes a PDCCH monitoring periodicity, a PDCCH monitoring offset, and indication signaling for indicating a starting position of a first symbol in which a PDCCH is located.

Here, the PDCCH monitoring periodicity includes at least one quantity of slots among following quantities of slots: 40, 80, 160, 320, 640, and 1280.

Or, the PDCCH monitoring periodicity includes at least one quantity of slots among following quantities of slots: $5*2^u$, $10*2^u$, $20*2^u$, $40*2^u$, $80*2^u$, and $160*2^u$, wherein u is determined according to a subcarrier spacing. For a specific correspondence between u and subcarrier spacing, refer to Table 1:

TABLE 1

Table of a correspondence between u and subcarrier spacing

| u | Subcarrier spacing |
|---|---|
| 0 | 15 kHz |
| 1 | 30 kHz |
| 2 | 60 kHz |
| 3 | 120 kHz |

When the PDCCH monitoring periodicity includes at least one quantity of slots among following quantities of slots: 40, 80, 160, 320, 640, and 1280 or the PDCCH monitoring periodicity includes at least one quantity of slots among following quantities of slots: $5*2^u$, $10*2^u$, $20*2^u$, $40*2^u$, $80*2^u$, and $160*2^u$, a value range of the PDCCH monitoring offset O is $0 \leq O < M$, where O is an integer, $M \leq K-1$, K is a quantity of slots included in the PDCCH monitoring periodicity, and u is determined according to a subcarrier spacing.

The value range of the PDCCH monitoring offset O is determined according to a time domain position candidate value that is determined from an SSB number and MIB signaling, or the value range of the PDCCH monitoring offset O is determined according to K and u, where K is a quantity of slots included in the PDCCH monitoring periodicity, and u is determined according to a subcarrier spacing.

Here, the indication signaling for indicating the starting position of the first symbol in which the PDCCH is located acts by using at least one of following manners of indication.

Manner 1: The indication signaling for indicating the starting position of the first symbol in which the PDCCH is located includes N pieces of slot-based first bitmap indication information, and the first bitmap indication information indicates the starting position of the first symbol in which the PDCCH is located in a corresponding slot, wherein the N pieces of first bitmap indication information are in a one-to-one correspondence with N consecutive slots, and the first slot in the N consecutive slots meets a predetermined condition.

The N pieces of slot-based first bitmap indication information correspond to N consecutive slots starting from a slot meeting the following formula respectively, that is, the predetermined condition that the first slot in the N consecutive slots meets is:

$$(n_f \cdot N_{slot}^{frame,\mu} + n_{s,f}^{\mu} - O) \bmod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity. Optionally, the value of O+N does not exceed K, i.e., $O+N \leq K$.

The N pieces of slot-based first bitmap indication information indicate the starting positions of the first symbols in which the PDCCH is located in the N slots, respectively. If a bit in the first bitmap indication information is 1, it represents that a symbol corresponding to the bit is the first symbol of the PDCCH.

Manner 2: The indication signaling for indicating the starting position of the first symbol in which the PDCCH is located includes one piece of slot-based second bitmap indication information, and the second bitmap indication information indicates the starting position of the first symbol in which the PDCCH is located in a corresponding slot, wherein the second bitmap indication information corresponds to each of N consecutive slots, and the first slot in the N consecutive slots meets a predetermined condition.

The manner 2 corresponds to a case in the foregoing manner 1 that if a bit in the first bitmap indication information is 1, it represents that a symbol corresponding to the bit is the first symbol in which the PDCCH is located. Certainly, in the manner 2, the slot-based second bitmap indication information corresponds to N consecutive slots starting from a slot meeting the following formula, that is, the predetermined condition that the first slot in the N consecutive slots meets is:

$$(n_f \cdot N_{slot}^{frame,\mu} + n_{s,f}^{\mu} - O) \bmod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity. Optionally, the value of O+N does not exceed K.

The slot-based second bitmap indication information indicates the starting positions of the first symbols in which the PDCCH is located in the N slots.

Manner 3: The indication signaling for indicating the starting position of the first symbol in which the PDCCH is located includes one piece of third bitmap indication information with a length of 14*N, the third bitmap indication information indicates the starting position of the first symbol in which the PDCCH is located in a corresponding slot, and the third bitmap indication information corresponds to N consecutive slots, and the first slot in the N consecutive slots meets a predetermined condition.

In all the foregoing three manners, the predetermined condition may be:

$$(n_f \cdot N_{slot}^{frame,\mu} + n_{s,f}^{\mu} - O) \bmod K = 0,$$

where f is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity. Optionally, the value of O+N does not exceed K.

14*N bits in the bitmap indication information with the length of 14*N are used for indicating the starting positions of the first symbols in which the PDCCH is located in the N slots. If a bit in the third bitmap indication information is 1, it represents that a symbol corresponding to the bit is the first symbol of the PDCCH.

In an embodiment, in the foregoing manner 1 to manner 3, when an SSB and CORESET multiplexing pattern 1 is concerned, N may be 2.

In an embodiment of the present disclosure, the PDCCH search space configuration signaling may further include N consecutive slots representing a PDCCH monitoring duration, and the first slot in the N consecutive slots meets the following condition:

$$(n_f \cdot N_{slot}^{frame,\mu} + n_{s,f}^{\mu} - O) \bmod K = 0,$$

where $n_f$ is a number of a radio frame in which the first slot is located, $N_{slot}^{frame,\mu}$ is a quantity of slots included in one radio frame, $n_{s,f}^\mu$ is a slot number of the first slot, u is associated with a subcarrier spacing, N is an integer greater than or equal to 1, O is the PDCCH monitoring offset, and K is a quantity of slots included in the PDCCH monitoring periodicity. Optionally, the value of O+N does not exceed K.

Specifically, in an embodiment, when an SSB and CORE-SET multiplexing pattern 1 is concerned, N is 2. In this case, UE may monitor a Type0-PDCCH over two consecutive slots. Therefore, with N being 2, the PDCCH search space configuration signaling may indicate a Type0-PDCCH time domain monitoring occasion, thereby a Type0-PDCCH time domain monitoring occasion may be completely described.

A step 22 includes: determining a time domain position for monitoring the PDCCH according to the PDCCH search space configuration signaling.

In the embodiment of the present disclosure, a PDCCH monitoring occasion is notified to the terminal through the PDCCH search space configuration signaling, wherein the PDCCH search space configuration signaling includes a PDCCH monitoring periodicity, a PDCCH monitoring offset, and indication signaling for indicating the starting position of a first symbol in which a PDCCH is located, so that a PDCCH time domain monitoring position may be determined through the PDCCH search space configuration signaling, thereby a Type0-PDCCH time domain monitoring occasion may be completely described.

In an embodiment of the present disclosure, the determining the time domain position for monitoring the PDCCH in the step 22 may further include:

when the terminal is in a beam failure recovery (BFR) procedure, or after the terminal initiates a BFR request and before a BFR procedure is completed, or after the terminal initiates a random access procedure for BFR and before a BFR procedure is completed, monitoring at least one of the following PDCCHs: a PDCCH with an aggregation level greater than a reference aggregation level, a PDCCH in a common search space, a PDCCH corresponding to a random access response, and a search space or a control resource set (CORESET) configured in BFR configuration information, where a PDCCH with the reference aggregation level is predefined or is configured through RRC signaling or is determined according to a beam failure detection threshold, and the beam failure detection threshold is a threshold used for determining a beam failure or a threshold used for determining whether to enter a BFR procedure.

The determining, by UE, the PDCCH time domain monitoring position according to the PDCCH search space configuration signaling may further include: determining, by the UE according to a quantity of PDCCHs that actually need to be monitored, a quantity of times of PDCCH monitoring or a quantity of candidate PDCCHs at the PDCCH time domain monitoring position. The quantity of PDCCHs that actually need to be monitored is determined according to a cyclic redundancy check (CRC) scrambling identifier (i.e., a radio network temporary identifier (RNTI)) in a downlink control information (DCI) format.

Specifically, if the to-be-monitored CRC scrambling identifier of the DCI is a rank indicator RNTI (RI-RNTI), a paging RNTI (P-RNTI) or a random access RNTI (RA-RNTI), the UE only needs to determine a PDCCH monitoring occasion according to the transmission time of a SIB, a paging, and a random access response (Msg2). The UE does not need to monitor an associated DCI format at all PDCCH time domain monitoring positions that are determined according to the PDCCH search space configuration signaling. In this case, the PDCCH monitoring capability of the UE may be used for monitoring another PDCCH search space or monitoring another DCI format.

Specifically, the UE determines the quantity of times of PDCCH monitoring or the quantity of candidate PDCCHs according to whether the UE is in a BFR procedure. If the UE is in the BFR procedure, the UE counts a PDCCH that needs to be monitored in the BFR procedure into the quantity of times of PDCCH monitoring or the quantity of candidate PDCCHs. If UE is not in the BFR procedure, the UE does not count a PDCCH that needs to be monitored in the BFR procedure into the quantity of times of PDCCH monitoring or the quantity of candidate PDCCHs.

If the UE is in a BFR procedure, the UE still needs to monitor a PDCCH with an aggregation level greater than a reference aggregation level. Further, in the BFR procedure, the UE counts a PDCCH with an aggregation level greater than a reference aggregation level into the quantity of times of PDCCH monitoring or the quantity of candidate PDCCHs.

Or, if the UE is in a BFR procedure, the UE does not need to monitor a PDCCH with an aggregation level less than or equal to the reference aggregation level. Further, in the BFR procedure, the UE does not count a PDCCH with an aggregation level less than or equal to the reference aggregation level into the quantity of times of PDCCH monitoring or the quantity of candidate PDCCHs.

Further, the UE determines, according to the quantity of times of PDCCH monitoring or the quantity of candidate PDCCHs, whether the quantity of times of PDCCH monitoring or the quantity of candidate PDCCHs of a current slot exceeds a limit of quantity of times of PDCCH monitoring.

In an embodiment of the present disclosure, the PDCCH search space configuration signaling may further include a search space identifier, where the value of the search space identifier is an integer greater than or equal to x, where x is an integer greater than 0. That is, the PDCCH search space configuration signaling transmitted by the base station does not include configuration information with a search space identifier of 0.

Specifically, in an embodiment, x may be 1.

A Type0-PDCCH search space is determined according to an SSB number and MIB signaling, the search space identifier of the Type0-PDCCH search space is 0, and the Type0-PDCCH search space includes a Type0-PDCCH search space corresponding to an SSB selected during initial access, or, a Type0-PDCCH search space corresponding to all SSBs in an accessed cell or carrier.

Figure 3:
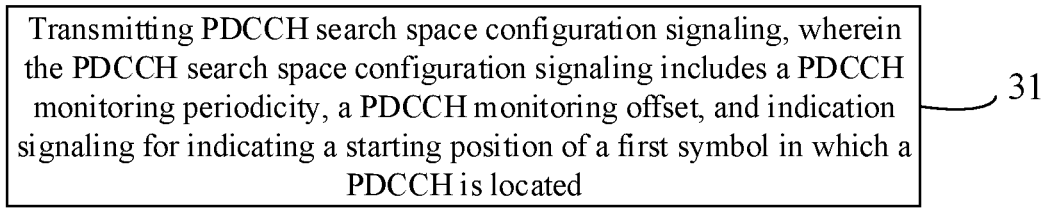
FIG. 3 is a schematic flowchart of a method for configuring a PDCCH time domain monitoring position on a base station side according to an embodiment of the present disclosure.

Referring to FIG. 3, the present disclosure further provides in an embodiment a method for configuring a PDCCH time domain monitoring position. The method is applied to a base station, and includes the following steps.

A step 31 includes: transmitting PDCCH search space configuration signaling, wherein the PDCCH search space configuration signaling includes a PDCCH monitoring periodicity, a PDCCH monitoring offset, and indication signaling for indicating the starting position of a first symbol in which a PDCCH is located.

It may be understood that in the foregoing method for configuring a PDCCH time domain monitoring position that is applied to a terminal, the PDCCH search space configuration signaling may be transmitted by a base station. Therefore, the method applied to a base station in the embodiment corresponds to the foregoing method applied to a terminal, and has corresponding beneficial effects. To avoid repetition, details are not described herein again.

Further, the PDCCH monitoring periodicity includes at least one quantity of slots among following quantities of slots: 40, 80, 160, 320, 640, and 1280.

Or, the PDCCH monitoring periodicity includes at least one quantity of slots among following quantities of slots: $5*2^u$, $10*2^u$, $20*2^u$, $40*2^u$, $80*2^u$, and $160*2^u$, where u is determined according to a subcarrier spacing.

Further, when the PDCCH monitoring periodicity includes at least one quantity of slots among following quantities of slots: 40, 80, 160, 320, 640, and 1280 or the PDCCH monitoring periodicity includes at least one quantity of slots among following quantities of slots: $5*2^u$, $10*2^u$, $20*2^u$, $40*2^u$, $80*2^u$, and $160*2^u$, the value range of the PDCCH monitoring offset O is 0≤O<M, where O is an integer, M<K−1, K is a quantity of slots included in the PDCCH monitoring periodicity, and u is determined according to a subcarrier spacing.

Further, the value range of the PDCCH monitoring offset O is determined according to a time domain position candidate value that is determined from an SSB number and MIB signaling, or the value range of the PDCCH monitoring offset O is determined according to K and u, where K is a quantity of slots included in the PDCCH monitoring periodicity, and u is determined according to a subcarrier spacing.

Further, the indication signaling for indicating the starting position of the first symbol in which the PDCCH is located acts by using at least one of following manners of indication:

Manner 1: the indication signaling for indicating the starting position of the first symbol in which the PDCCH is located includes N pieces of slot-based first bitmap indication information, and the first bitmap indication information indicates the starting position of the first symbol in which the PDCCH is located in a corresponding slot, where the N pieces of first bitmap indication information are in a one-to-one correspondence with N consecutive slots, and the first slot in the N consecutive slots meets a predetermined condition;

Manner 2: the indication signaling for indicating the starting position of the first symbol in which the PDCCH is located includes one piece of slot-based second bitmap indication information, and the second bitmap indication information indicates the starting position of the first symbol in which the PDCCH is located in a corresponding slot, where the second bitmap indication information corresponds to each of N consecutive slots, and the first slot in the N consecutive slots meets a predetermined condition;

Manner 3: the indication signaling for indicating the starting position of the first symbol in which the PDCCH is located includes one piece of third bitmap indication information with a length of 14*N, the third bitmap indication information indicates the starting position of the first symbol in which the PDCCH is located in a corresponding slot, and the third bitmap indication information corresponds to N consecutive slots, and the first slot in the N consecutive slots meets a predetermined condition;

the predetermined condition is:

$$(n_f N_{slot}^{frame,\mu} + n_{s,f}^\mu - O) \bmod K = 0,$$

where $n_f$ is a number of a radio frame in which the first slot is located, $N_{slot}^{frame,\mu}$ is a quantity of slots included in one radio frame, $n_{s,f}^\mu$ is a slot number of the first slot, u is associated with a subcarrier spacing, N is an integer greater than or equal to 1, O is the PDCCH monitoring offset, and K is a quantity of slots included in the PDCCH monitoring periodicity.

Further, the PDCCH search space configuration signaling may further include N consecutive slots representing a PDCCH monitoring duration, and the first slot in the N consecutive slots meets the following condition:

$$(n_f N_{slot}^{frame,\mu} + n_{s,f}^\mu - O) \bmod K = 0,$$

where $n_f$ is a number of a radio frame in which the first slot is located, $N_{slot}^{frame,\mu}$ is a quantity of slots included in one radio frame, $n_{s,f}^\mu$ is a slot number of the first slot, u is associated with a subcarrier spacing, N is an integer greater than or equal to 1, O is the PDCCH monitoring offset, and K is a quantity of slots included in the PDCCH monitoring periodicity.

Further, when an SSB and CORESET multiplexing pattern 1 is concerned, N is 2.

Further, the PDCCH search space configuration signaling further includes a search space identifier, where the value of the search space identifier is an integer greater than or equal to x, where x is an integer greater than 0.

Referring to FIG. 4, the present disclosure further provides in an embodiment a method for configuring a PDCCH time domain monitoring position. The method is applied to a base station and includes the following steps.

A step 41 includes: transmitting PDCCH search space configuration signaling, wherein the PDCCH search space configuration signaling includes a search space identifier, and the search space identifier is search space configuration information greater than or equal to x, wherein x is an integer greater than 0, and a search space with a search space identifier of 0 corresponds to a Type0-PDCCH search space. The value of x may be 1.

Referring to FIG. 5, the present disclosure further provides in an embodiment a terminal 50, including a processor 51 and a transceiver 52.

The transceiver 52 is configured to receive PDCCH search space configuration signaling, wherein the PDCCH search space configuration signaling includes a PDCCH monitoring periodicity, a PDCCH monitoring offset, and indication signaling for indicating the starting position of a first symbol in which a PDCCH is located.

The processor 51 is configured to determine a time domain position for monitoring the PDCCH according to the PDCCH search space configuration signaling.

The terminal in the embodiment of the present disclosure can implement various processes in the foregoing method embodiment applied to a terminal and has corresponding beneficial effects. To avoid repetition, details are not described herein again.

Further, the PDCCH monitoring periodicity includes at least one quantity of slots among following quantities of slots: 40, 80, 160, 320, 640, and 1280.

Or, the PDCCH monitoring periodicity includes at least one quantity of slots among following quantities of slots: $5*2^u$, $10*2^u$, $20*2^u$, $40*2^u$, $80*2^u$, and $160*2^u$, where u is determined according to a subcarrier spacing.

Further, when the PDCCH monitoring periodicity includes at least one quantity of slots among following quantities of slots: 40, 80, 160, 320, 640, and 1280 or the PDCCH monitoring periodicity includes at least one quantity of slots among following quantities of slots: $5*2^u$, $10*2^u$, $20*2^u$, $40*2^u$, $80*2^u$, and $160*2^u$, the value range of the PDCCH monitoring offset O is 0≤O<M, where O is an integer, M<K−1, K is a quantity of slots included in the PDCCH monitoring periodicity, and u is determined according to a subcarrier spacing.

Further, the value range of the PDCCH monitoring offset O is determined according to a time domain position candidate value that is determined from an SSB number and MIB signaling, or the value range of the PDCCH monitoring offset O is determined according to K and u, where K is a quantity of slots included in the PDCCH monitoring periodicity, and u is determined according to a subcarrier spacing.

Further, the indication signaling for indicating the starting position of the first symbol in which the PDCCH is located acts by using at least one of following manners of indication:

Manner 1: the indication signaling for indicating the starting position of the first symbol in which the PDCCH is located includes N pieces of slot-based first bitmap indication information, and the first bitmap indication information indicates the starting position of the first symbol in which the PDCCH is located in a corresponding slot, where the N pieces of first bitmap indication information are in a one-to-one correspondence with N consecutive slots, and the first slot in the N consecutive slots meets a predetermined condition;

Manner 2: the indication signaling for indicating the starting position of the first symbol in which the PDCCH is located includes one piece of slot-based second bitmap indication information, the second bitmap indication information indicates the starting position of the first symbol in which the PDCCH is located in a corresponding slot, and the second bitmap indication information corresponds to each of N consecutive slots, and the first slot in the N consecutive slots meets a predetermined condition;

Manner 3: the indication signaling for indicating the starting position of the first symbol in which the PDCCH is located includes one piece of third bitmap indication information with a length of 14*N, the third bitmap indication information indicates the starting position of the first symbol in which the PDCCH is located in a corresponding slot, and the third bitmap indication information corresponds to N consecutive slots, and the first slot in the N consecutive slots meets a predetermined condition;

the predetermined condition is:

$$(n_f N_{slot}^{frame,\mu} + n_{s,f}^{\mu} - O) \bmod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity.

Further, the PDCCH search space configuration signaling may further include N consecutive slots representing a PDCCH monitoring duration, and the first slot in the N consecutive slots meets the following condition:

$$(n_f N_{slot}^{frame,\mu} + n_{s,f}^{\mu} - O) \bmod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity.

Further, when an SSB and CORESET multiplexing pattern 1 is concerned, N is 2.

Further, the processor 51 is configured to:

when the terminal is in a BFR procedure, or after the terminal initiates a BFR request and before a BFR procedure is completed, or after the terminal initiates a random access procedure for BFR and before a BFR procedure is completed, monitor at least one of the following PDCCHs: a PDCCH with an aggregation level greater than a reference aggregation level, a PDCCH in a common search space, a PDCCH corresponding to a random access response, and a search space or a control resource set configured in BFR configuration information, where a PDCCH with the reference aggregation level is predefined or is configured through RRC signaling or is determined according to a beam failure detection threshold, and the beam failure detection threshold is a threshold used for determining a beam failure or a threshold used for determining whether to enter the BFR procedure.

Further, the PDCCH search space configuration signaling further includes a search space identifier, where the value of the search space identifier is an integer greater than or equal to x, where x is an integer greater than 0.

Further, a Type0-PDCCH search space is determined according to an SSB number and MIB signaling, the search space identifier of the Type0-PDCCH search space is 0, and the Type0-PDCCH search space includes a Type0-PDCCH search space corresponding to an SSB selected during initial access, or, a Type0-PDCCH search space corresponding to all SSBs in an accessed cell or carrier.

Figure 6:
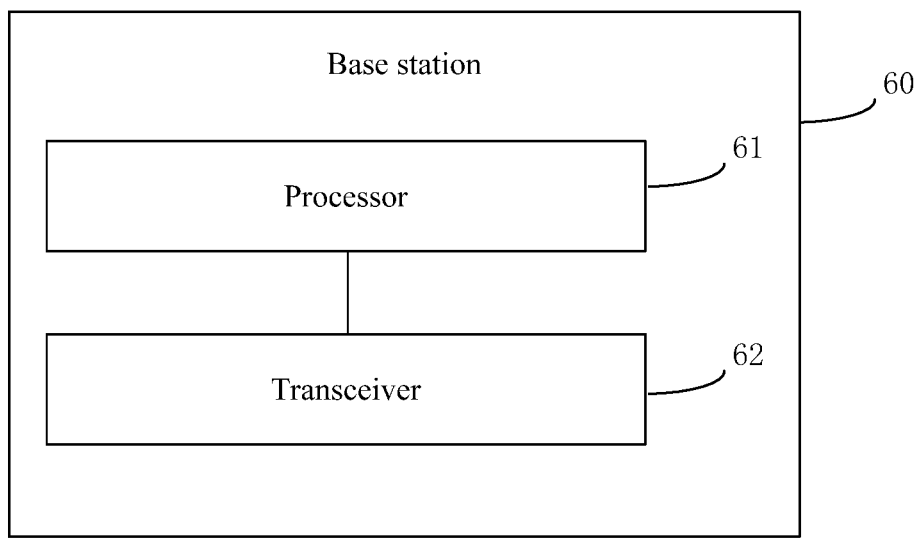
FIG. 6 is a schematic structural diagram of a base station according to an embodiment of the present disclosure.

Referring to FIG. 6, the present disclosure further provides in an embodiment a base station 60, including a processor 61 and a transceiver 62.

The transceiver 62 is configured to transmit PDCCH search space configuration signaling, wherein the PDCCH search space configuration signaling includes a PDCCH monitoring periodicity, a PDCCH monitoring offset, and indication signaling for indicating the starting position of a first symbol in which a PDCCH is located.

The base station in the embodiment of the present disclosure can implement various processes in the foregoing corresponding method embodiment applied to a base station and has corresponding beneficial effects. To avoid repetition, details are not described herein again.

Further, the PDCCH monitoring periodicity includes at least one quantity of slots among following quantities of slots: 40, 80, 160, 320, 640, and 1280.

Or, the PDCCH monitoring periodicity includes at least one quantity of slots among following quantities of slots: $5*2^u$, $10*2^u$, $20*2^u$, $40*2^u$, $80*2^u$, and $160*2^u$, where u is determined according to a subcarrier spacing.

Further, when the PDCCH monitoring periodicity includes at least one quantity of slots among following quantities of slots: 40, 80, 160, 320, 640, and 1280 or the PDCCH monitoring periodicity includes at least one quantity of slots among following quantities of slots: $5*2^u$, $10*2^u$, $20*2^u$, $40*2^u$, $80*2^u$, and $160*2^u$, the value range of the PDCCH monitoring offset O is $0 \leq O < M$, where O is an integer, $M < K-1$, K is a quantity of slots included in the PDCCH monitoring periodicity, and u is determined according to a subcarrier spacing.

Further, the value range of the PDCCH monitoring offset O is determined according to a time domain position candidate value that is determined from an SSB number and MIB signaling, or the value range of the PDCCH monitoring offset O is determined according to K and u, where K is a quantity of slots included in the PDCCH monitoring periodicity, and u is determined according to a subcarrier spacing.

Further, the indication signaling for indicating the starting position of the first symbol in which the PDCCH is located acts by using at least one of following manners of indication:

Manner 1: the indication signaling for indicating the starting position of the first symbol in which the PDCCH is located includes N pieces of slot-based first bitmap indication information, and the first bitmap indication information indicates the starting position of the first symbol in which the PDCCH is located in a corresponding slot, where the N pieces of first bitmap indication information are in a one-to-one correspondence with N consecutive slots, and the first slot in the N consecutive slots meets a predetermined condition;

Manner 2: the indication signaling for indicating the starting position of the first symbol in which the PDCCH is located includes one piece of slot-based second bitmap indication information, and the second bitmap indication information indicates the starting position of the first symbol in which the PDCCH is located in a corresponding slot, where the second bitmap indication information corresponds to each of N consecutive slots, and the first slot in the N consecutive slots meets a predetermined condition;

Manner 3: the indication signaling for indicating the starting position of the first symbol in which the PDCCH is located includes one piece of third bitmap indication information with a length of 14*N, the third bitmap indication information indicates the starting position of the first symbol in which the PDCCH is located in a corresponding slot, and the third bitmap indication information corresponds to N consecutive slots, and the first slot in the N consecutive slots meets a predetermined condition;

the predetermined condition is:

$$(n_f N_{slot}^{frame,\mu} + n_{s,f}^{\mu} - O) \mod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity.

Further, the PDCCH search space configuration signaling includes N consecutive slots representing a PDCCH monitoring duration, and the first slot in the N consecutive slots meets the following condition:

$$(n_f N_{slot}^{frame,\mu} + n_{s,f}^{\mu} - O) \mod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity.

Further, when an SSB and CORESET multiplexing pattern 1 is concerned, N is 2.

Further, the PDCCH search space configuration signaling further includes a search space identifier, where the value of the search space identifier is an integer greater than or equal to x, where x is an integer greater than 0.

Figure 7:
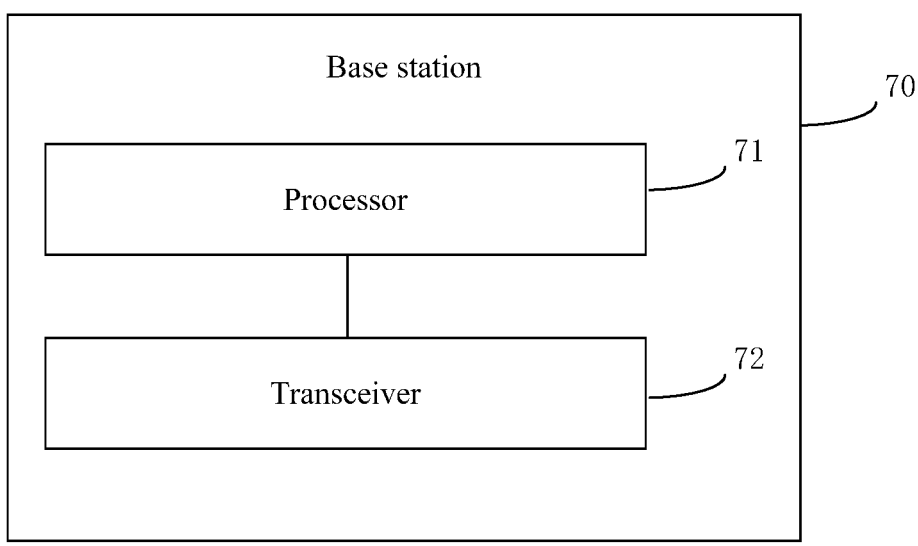
FIG. 7 is another schematic structural diagram of a base station according to an embodiment of the present disclosure.

Referring to FIG. 7, the present disclosure further provides in another embodiment a base station 70, including a processor 71 and a transceiver 72.

The transceiver 72 is configured to transmit PDCCH search space configuration signaling, wherein the PDCCH search space configuration signaling includes a search space identifier, and the search space identifier is search space configuration information greater than or equal to x, wherein x is an integer greater than 0, and a search space with a search space identifier of 0 corresponds to a Type0-PDCCH search space.

The base station in the embodiment of the present disclosure can implement various processes in the foregoing corresponding method embodiment applied to a base station and has corresponding beneficial effects. To avoid repetition, details are not described herein again.

The methods of the present disclosure are respectively described in the foregoing embodiments from the perspectives of a network device side and a UE side. Devices corresponding to the methods are further described in the following embodiments with reference to the accompanying drawings.

Figure 8:
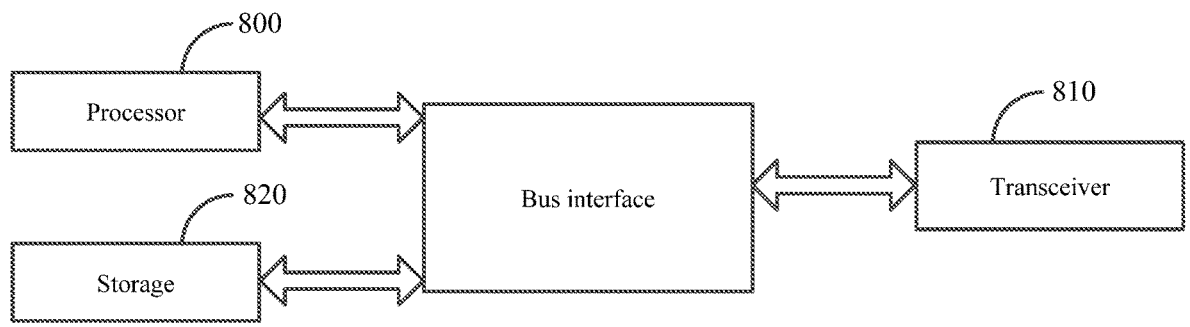
FIG. 8 is a schematic structural diagram of a network device according to an embodiment of the present disclosure.

As shown in FIG. 8, the present disclosure further provides in an embodiment a network device. The network device may be a base station. As shown in FIG. 8, the network device includes a processor 800 and a transceiver 810.

In the embodiment of the present disclosure, the network device may further include a storage 820 connected to the processor 800 by a bus interface. The transceiver 810 is connected to the processor 800 by a bus interface. The storage 820 may store a program and data used by the processor while performing operations. The processor 800 may invoke and execute the program and data stored in the storage 820.

The processor 800 is configured to transmit PDCCH search space configuration signaling, wherein the PDCCH search space configuration signaling includes a PDCCH monitoring periodicity, a PDCCH monitoring offset, and indication signaling for indicating the starting position of a first symbol in which a PDCCH is located.

Here, optionally, the PDCCH monitoring periodicity includes at least one quantity of slots among following quantities of slots: 40, 80, 160, 320, 640, and 1280.

Or, the PDCCH monitoring periodicity includes at least one quantity of slots among following quantities of slots: $5*2^u$, $10*2^u$, $20*2^u$, $40*2^u$, $80*2^u$, and $160*2^u$, where u is determined according to a subcarrier spacing.

Here, optionally, when the PDCCH monitoring periodicity includes at least one quantity of slots among following quantities of slots: 40, 80, 160, 320, 640, and 1280 or the PDCCH monitoring periodicity includes at least one quantity of slots among following quantities of slots: $5*2^u$, $10*2^u$, $20*2^u$, $40*2^u$, $80*2^u$, and $160*2^u$, the value range of the PDCCH monitoring offset O is $0 \leq O < M$, where O is an integer, $M < K-1$, K is a quantity of slots included in the PDCCH monitoring periodicity, and u is determined according to a subcarrier spacing.

Here, optionally, the value range of the PDCCH monitoring offset O is determined according to a time domain position candidate value that is determined from an SSB number and MIB signaling, or the value range of the PDCCH monitoring offset O is determined according to K and u, where K is a quantity of slots included in the PDCCH monitoring periodicity, and u is determined according to a subcarrier spacing.

Here, optionally, the indication signaling for indicating the starting position of the first symbol in which the PDCCH is located acts by using at least one of following manners of indication:

Manner 1: the indication signaling for indicating the starting position of the first symbol in which the PDCCH is located includes N pieces of slot-based first bitmap indication information, and the first bitmap indication information indicates the starting position of the first symbol in which the PDCCH is located in a corresponding slot, where the N pieces of first bitmap indication information are in a oneto-one correspondence with N consecutive slots, and the first slot in the N consecutive slots meets a predetermined condition;

Manner 2: the indication signaling for indicating the starting position of the first symbol in which the PDCCH is located includes one piece of slot-based second bitmap indication information, and the second bitmap indication information indicates the starting position of the first symbol in which the PDCCH is located in a corresponding slot, where the second bitmap indication information corresponds to each of N consecutive slots, and the first slot in the N consecutive slots meets a predetermined condition;

Manner 3: the indication signaling for indicating the starting position of the first symbol in which the PDCCH is located includes one piece of third bitmap indication information with a length of 14*N, and the third bitmap indication information indicates the starting position of the first symbol in which the PDCCH is located in a corresponding slot, where the third bitmap indication information corresponds to N consecutive slots, and the first slot in the N consecutive slots meets a predetermined condition;

the predetermined condition is:

$$(n_f N_{slot}^{frame,\mu} + n_{s,f}^\mu - O) \bmod K = 0,$$

where $n_f$ is a number of a radio frame in which the first slot is located, $N_{slot}^{frame,\mu}$ is a quantity of slots included in one radio frame, $n_{s,f}^\mu$ is a slot number of the first slot, u is associated with a subcarrier spacing, N is an integer greater than or equal to 1, O is the PDCCH monitoring offset, and K is a quantity of slots included in the PDCCH monitoring periodicity.

Here, optionally, the PDCCH search space configuration signaling may further include N consecutive slots representing a PDCCH monitoring duration, and the first slot in the N consecutive slots meets the following condition:

$$(n_f N_{slot}^{frame,\mu} + n_{s,f}^\mu - O) \bmod K = 0,$$

where $n_f$ is a number of a radio frame in which the first slot is located, $N_{slot}^{frame,\mu}$ is a quantity of slots included in one radio frame, $n_{s,f}^\mu$ is a slot number of the first slot, u is associated with a subcarrier spacing, N is an integer greater than or equal to 1, O is the PDCCH monitoring offset, and K is a quantity of slots included in the PDCCH monitoring periodicity.

Here, optionally, when an SSB and CORESET multiplexing pattern 1 is concerned, N is 2.

Here, optionally, the PDCCH search space configuration signaling further includes a search space identifier, where the value of the search space identifier is an integer greater than or equal to x, where x is an integer greater than 0.

In FIG. 8, a bus architecture may include any quantity of interconnected buses and bridges. Specifically, various circuits such as one or more processors represented by the processor 800 and a storage represented by the storage 820 are linked together. The bus architecture may also link various other circuits such as peripherals, voltage regulators, and power management circuits, which are well known in the art, and therefore are not further described herein. The bus interface provides an interface. The transceiver 810 may include a plurality of elements, that is, a transmitter and a receiver, to provide units for communicating with various other apparatuses over a transmission medium. The processor 800 is responsible for managing the bus architecture and general processing. The storage 820 can store data used by the processor 800 while performing operations.

The embodiment of the network device in the present disclosure corresponds to the foregoing embodiment of the method for configuring a PDCCH time domain monitoring position that is applied to a base station. All implementation measures in the foregoing embodiment of the method are applicable to the embodiment of the network device and can achieve the same technical effect.

A person skilled in the art may understand that all or some of the steps of the embodiments may be implemented by hardware or a computer program instructing relevant hardware. The computer program includes instructions for performing some or all steps in the foregoing method. The computer program may be stored in a readable storage medium. The storage medium may be a storage medium in any form.

Figure 9:
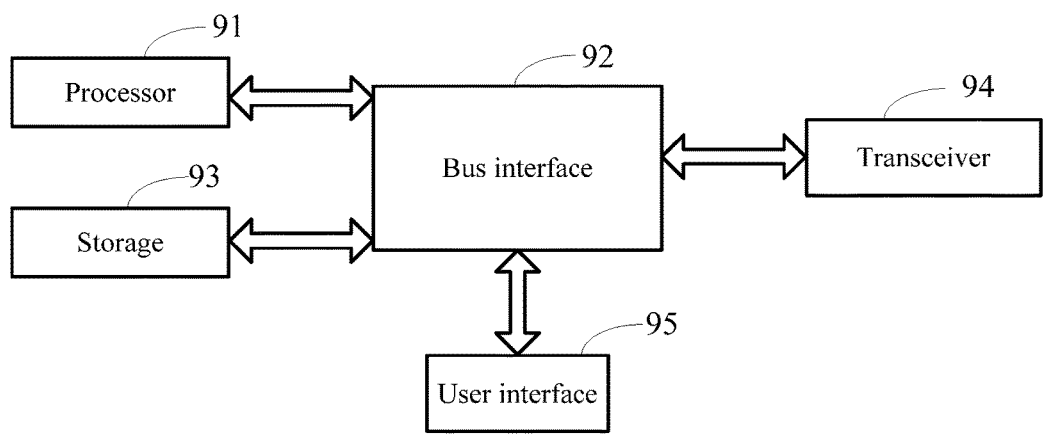
FIG. 9 is a schematic structural diagram of UE according to an embodiment of the present disclosure.

As shown in FIG. 9, an embodiment of the present disclosure provides UE, including:

a processor 91; and a storage 93 connected to the processor 91 by a bus interface 92, where the storage 93 is used for storing a program and data used by the processor 91 while performing operations, and the processor 91 invokes and executes the program and data stored in the storage 93. A transceiver 94 is connected to the bus interface 92.

The processor 91 is configured to: receive PDCCH search space configuration signaling, wherein the PDCCH search space configuration signaling includes a PDCCH monitoring periodicity, a PDCCH monitoring offset, and indication signaling for indicating the starting position of a first symbol in which a PDCCH is located; and determine a time domain position for monitoring the PDCCH according to the PDCCH search space configuration signaling.

Here, the PDCCH monitoring periodicity includes at least one quantity of slots among following quantities of slots: 40, 80, 160, 320, 640, and 1280.

Or, the PDCCH monitoring periodicity includes at least one quantity of slots among following quantities of slots: $5*2^u$, $10*2^u$, $20*2^u$, $40*2^u$, $80*2^u$, and $160*2^u$, where u is determined according to a subcarrier spacing.

Here, when the PDCCH monitoring periodicity includes at least one quantity of slots among following quantities of slots: 40, 80, 160, 320, 640, and 1280 or the PDCCH monitoring periodicity includes at least one quantity of slots among following quantities of slots: $5*2^u$, $10*2^u$, $20*2^u$, $40*2^u$, $80*2^u$, and $160*2^u$, the value range of the PDCCH monitoring offset O is $0 \leq O < M$, where O is an integer, $M < K-1$, K is a quantity of slots included in the PDCCH monitoring periodicity, and u is determined according to a subcarrier spacing.

Here, the value range of the PDCCH monitoring offset O is determined according to a time domain position candidate value that is determined from an SSB number and MIB signaling, or the value range of the PDCCH monitoring offset O is determined according to K and u, where K is a quantity of slots included in the PDCCH monitoring periodicity, and u is determined according to a subcarrier spacing.

Here, the indication signaling for indicating the starting position of the first symbol in which the PDCCH is located acts by using at least one of following manners of indication:

Manner 1: the indication signaling for indicating the starting position of the first symbol in which the PDCCH is located includes N pieces of slot-based first bitmap indication information, and the first bitmap indication information indicates the starting position of the first symbol in which the PDCCH is located in a corresponding slot, where the N pieces of first bitmap indication information are in a oneto-one correspondence with N consecutive slots, and the first slot in the N consecutive slots meets a predetermined condition;

Manner 2: the indication signaling for indicating the starting position of the first symbol in which the PDCCH is located includes one piece of slot-based second bitmap indication information, and the second bitmap indication information indicates the starting position of the first symbol in which the PDCCH is located in a corresponding slot, where the second bitmap indication information corresponds to each of N consecutive slots, and the first slot in the N consecutive slots meets a predetermined condition;

Manner 3: the indication signaling for indicating the starting position of the first symbol in which the PDCCH is located includes one piece of third bitmap indication information with a length of 14*N, the third bitmap indication information indicates the starting position of the first symbol in which the PDCCH is located in a corresponding slot, and the third bitmap indication information corresponds to N consecutive slots, and the first slot in the N consecutive slots meets a predetermined condition;

the predetermined condition is:

$$(n_f N_{slot}^{frame,\mu} + n_{s,f}^{\mu} - O) \mod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity.

Here, the PDCCH search space configuration signaling further includes N consecutive slots representing a PDCCH monitoring duration, and the first slot in the N consecutive slots meets the following condition:

$$(n_f N_{slot}^{frame,\mu} + n_{s,f}^{\mu} - O) \mod K = 0,$$

where $n_f$ is a number of a radio frame in which the first slot is located, $N_{slot}^{frame,\mu}$ is a quantity of slots included in one radio frame, $n_{s,f}^{\mu}$ is a slot number of the first slot, u is associated with a subcarrier spacing, N is an integer greater than or equal to 1, O is the PDCCH monitoring offset, and K is a quantity of slots included in the PDCCH monitoring periodicity.

Here, when an SSB and CORESET multiplexing pattern 1 is concerned, N is 2.

Optionally, the determining the time domain position for monitoring the PDCCH further includes:

when the terminal is in a BFR procedure, or after the terminal initiates a BFR request and before a BFR procedure is completed, or after the terminal initiates a random access procedure for BFR and before a BFR procedure is completed, monitoring at least one of the following PDCCHs: a PDCCH with an aggregation level greater than a reference aggregation level, a PDCCH in a common search space, a PDCCH corresponding to a random access response, and a search space or a control resource set (CORESET) configured in BFR configuration information, where a PDCCH with the reference aggregation level is predefined or is configured through RRC signaling or is determined according to a beam failure detection threshold, and the beam failure detection threshold is a threshold used for determining a beam failure or a threshold used for determining whether to enter the BFR procedure.

Here, the PDCCH search space configuration signaling further includes a search space identifier, where the value of the search space identifier is an integer greater than or equal to x, where x is an integer greater than 0.

Here, a Type0-PDCCH search space is determined according to an SSB number and MIB signaling, the search space identifier of the Type0-PDCCH search space is 0, and the Type0-PDCCH search space includes a Type0-PDCCH search space corresponding to an SSB selected during initial access, or, a Type0-PDCCH search space corresponding to all SSBs in an accessed cell or carrier.

It needs to be noted that, in FIG. 9, a bus architecture may include any quantity of interconnected buses and bridges. Specifically, various circuits such as one or more processors represented by the processor 91 and a storage represented by the storage 93 are linked together. The bus architecture may also link various other circuits such as peripherals, voltage regulators, and power management circuits, which are well known in the art, and therefore are not further described herein. The bus interface provides an interface. The transceiver 94 may include a plurality of elements, that is, a transmitter and a receiver, to provide units for communicating with various other apparatuses over a transmission medium. For different user devices, a user interface 95 may be an interface capable of externally/internally connecting desired devices, including, but not limited to, a keypad, a display, a speaker, a microphone, and a joystick. The processor 91 is responsible for managing the bus architecture and general processing. The storage 93 can store data used by the processor 91 while performing operations.

The embodiment of the UE in the present disclosure corresponds to the foregoing embodiment of the method applied to a terminal. All implementation measures in the foregoing embodiment of the method are applicable to the embodiment of the UE and can achieve the same technical effect.

A person skilled in the art may understand that all or some of the steps of the embodiments may be implemented by hardware or a computer program instructing relevant hardware. The computer program includes instructions for performing some or all steps in the foregoing method. The computer program may be stored in a readable storage medium. The storage medium may be a storage medium in any form.

Figure 10:
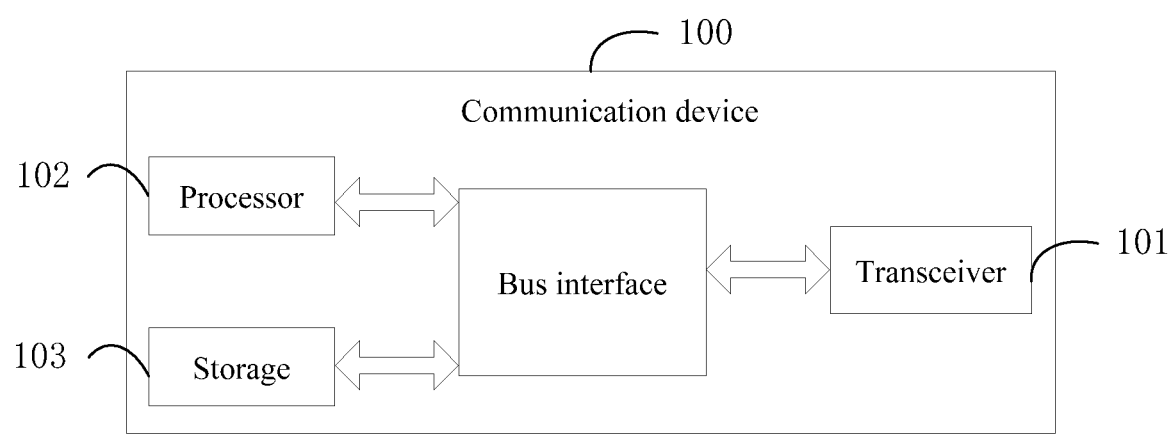
FIG. 10 is a schematic structural diagram of a communication device according to an embodiment of the present disclosure.

As shown in FIG. 10, a communication device 100 of the present disclosure includes: a processor 102 and a storage 103 storing a computer program, where the processor 102 is configured to execute the computer program to perform the methods described in the foregoing embodiments.

It needs to be noted that the communication device may be the foregoing core network device or base station or may be the foregoing terminal, and can achieve the technical effects achieved by the foregoing core network device, base station or terminal. The communication device may further include: a transceiver 101 communicatively connected to the processor 102 by a bus interface or an interface. The transceiver 101 may also be communicatively connected to the storage 103 by a bus interface or an interface. The functions of the foregoing transceiver may be alternatively implemented by a processor. The communication device in the present disclosure may further include other parts for implementing the foregoing methods. All implementation measures in the foregoing embodiments of the methods are applicable to the embodiment of the communication device and can achieve the same technical effects.

The present disclosure further provides in an embodiment a computer-readable storage medium, including instructions, where the instructions are configured to be executed by a computer to perform the foregoing method. Specifically, the computer-readable storage medium stores therein a computer program, and the computer program is configured to be executed by a processor to implement various processes of the foregoing embodiments of the method for configuring a PDCCH time domain monitoring position, and can achieve the same technical effects. To avoid repetition, details are not described herein again. The computer-readable storage medium is, for example, a read-only memory (ROM), a random access memory (RAM), a magnetic disk, an optical disc or the like.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a universal serial bus (USB) flash drive, a removable hard disk, an ROM, an RAM, a magnetic disk, or an optical disc.

In addition, it should be noted that in the apparatuses or methods of the present disclosure, apparently, parts or steps may be divided and/or recombined. The division and/or recombination should be regarded as equivalent embodiments of the present disclosure. Moreover, steps of the above series of processes may be performed naturally in the time order of description, however the performing sequence is not limited to the time order. Some steps may be performed in parallel or independently. Persons of ordinary skill in the art can appreciate that all or any steps or parts of the methods and apparatuses of the present disclosure may be implemented in form of hardware, firmware, software or a combination thereof in any computing apparatus (including a processor, a storage medium or the like) or a network of computing apparatuses, and this can be achieved by persons of ordinary skill in the art by using their basic programming skill after reading the description of the present disclosure.

Therefore, the objective of the present disclosure may also be implemented by running a program or a set of programs on any computing apparatus. The computing apparatus may be a known general purpose apparatus. Therefore, the objective of the present disclosure may also be implemented merely by providing a program product which contains program code for implementing the methods or apparatuses. That is, such program product can constitute the present disclosure, and a storage medium in which such program product is stored can also constitute the present disclosure. Apparently, the storage medium may be any known storage medium or any storage medium that will be developed in future. It should also be noted that, in the apparatuses and methods of the present disclosure, apparently, parts or steps may be divided and/or recombined. The division and/or recombination should be regarded as equivalent embodiments of the present disclosure. Moreover, steps of the above series of processes may be performed naturally in the time order of description, but the performing sequence is not limited to the time order. Some steps may be performed in parallel or independently.

The foregoing descriptions are optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A method for configuring a physical downlink control channel (PDCCH) time domain monitoring position, applied to a terminal, comprising:
receiving a PDCCH search space configuration signaling, wherein the PDCCH search space configuration signaling comprises a PDCCH monitoring periodicity, a PDCCH monitoring offset, and an indication signaling for indicating a starting position of a first symbol in which a PDCCH is located; and
determining a time domain position for monitoring the PDCCH according to the PDCCH search space configuration signaling;
wherein the indication signaling for indicating the starting position of the first symbol in which the PDCCH is located acts by using at least one of following manners of indication:
Manner 2: the indication signaling for indicating the starting position of the first symbol in which the PDCCH is located comprises one piece of slot-based second bitmap indication information, and the second bitmap indication information indicates a starting position of a first symbol in which the PDCCH is located in each slot of N consecutive slots, and a first slot in the N consecutive slots meets a predetermined condition; and Manner 3: the indication signaling for indicating the starting position of the first symbol in which the PDCCH is located comprises one piece of third bitmap indication information with a length of 14*N, wherein * represents a multiplication operation, the third bitmap indication information indicates a starting position of a first symbol in which the PDCCH is located in a corresponding slot, and the third bitmap indication information corresponds to N consecutive slots, and a first slot in the N consecutive slots meets a predetermined condition;

the predetermined condition is:

$$(n_f N_{slot}^{frame,\mu} + n_{s,f}^{\mu} - 0) \mod K = 0,$$

wherein $n_f$ is a number of a radio frame in which the first slot is located, slot is a quantity of slots comprised in one radio frame, $N_{slot}^{frame,\mu}$ is a slot number of the first slot, u is associated with a subcarrier spacing, N is an integer greater than 1, O is the PDCCH monitoring offset, and K is a quantity of slots comprised in the PDCCH monitoring periodicity.

2. The method according to claim 1, wherein the PDCCH monitoring periodicity comprises at least one quantity of slots among following quantities of slots: 40, 80, 160, 320, 640, and 1280; or the PDCCH monitoring periodicity comprises at least one quantity of slots among following quantities of slots: 5*2u, 10*2u, 20*2u, 40*2u, 80*2u, and 160*2u, wherein * represents a multiplication operation, and u is determined according to a subcarrier spacing.

3. The method according to claim 1, wherein when the PDCCH monitoring periodicity comprises at least one quantity of slots among following quantities of slots: 40, 80, 160, 320, 640, and 1280 or the PDCCH monitoring periodicity comprises at least one quantity of slots among following quantities of slots: 5*2u, 10*2u, 20*2u, 40*2u, 80*2u, and 160*2u, a value range of the PDCCH monitoring offset (O) is 0≤O<M, wherein * represents a multiplication operation, O is an integer, M<K−1, K is a quantity of slots comprised in the PDCCH monitoring periodicity, and u is determined according to a subcarrier spacing.

4. The method according to claim 1, wherein
a value range of the PDCCH monitoring offset (O) is determined according to a time domain position candidate value that is determined from a synchronization signal block (SSB) number and master information block (MIB) signaling, or a value range of the PDCCH monitoring offset (O) is determined according to K and u, wherein K is a quantity of slots comprised in the PDCCH monitoring periodicity, and u is determined according to a subcarrier spacing.

5. The method according to claim 1, wherein the PDCCH search space configuration signaling further comprises N consecutive slots representing a PDCCH monitoring duration, and a first slot in the N consecutive slots meets the following condition:

$$(n_f N_{slot}^{frame,\mu} + n_{s,f}^{\mu} - 0) \mod K = 0,$$

wherein $n_f$ is a number of a radio frame in which the first slot is located, $N_{slot}^{frame,\mu}$ is a quantity of slots comprised in one radio frame, $n_{s,f}^{\mu}$ is a slot number of the first slot, u is associated with a subcarrier spacing, N is an integer greater than 1, O is the PDCCH monitoring offset, and K is a quantity of slots comprised in the PDCCH monitoring periodicity.

6. The method according to claim 1, wherein when a synchronization signal block (SSB) and control resource set (CORESET) multiplexing pattern 1 is concerned, N is 2.

7. The method according to claim 1, wherein the determining the time domain position for monitoring the PDCCH further comprises:
when the terminal is in a beam failure recovery (BFR) procedure, or after the terminal initiates a BFR request and before a BFR procedure is completed, or after the terminal initiates a random access procedure for BFR and before a BFR procedure is completed, monitoring at least one of following PDCCHs: a PDCCH with an aggregation level greater than a reference aggregation level, a PDCCH in a common search space, a PDCCH corresponding to a random access response, or a search space or a control resource set (CORESET) configured in BFR configuration information, wherein a PDCCH with the reference aggregation level is predefined or is configured through radio resource control (RRC) signaling or is determined according to a beam failure detection threshold, and the beam failure detection threshold is a threshold used for determining a beam failure or a threshold used for determining whether to enter a BFR procedure.

8. The method according to claim 1, wherein the PDCCH search space configuration signaling further comprises a search space identifier, and the search space identifier is an integer greater than or equal to x, wherein x is an integer greater than 0.

9. The method according to claim 1, wherein a Type0-PDCCH search space is determined according to a synchronization signal block (SSB) number and master information block (MIB) signaling, and the search space identifier of the Type0-PDCCH search space is 0, wherein the Type0-PDCCH search space comprises a Type0-PDCCH search space corresponding to an SSB selected during initial access, or a Type0-PDCCH search space corresponding to all SSBs in an accessed cell or carrier.

10. A terminal, comprising a processor and a storage storing a computer program, wherein the processor is configured to execute the computer program to implement the method according to claim 1.

11. A method for configuring a physical downlink control channel (PDCCH) time domain monitoring position, applied to a base station, comprising:
transmitting a PDCCH search space configuration signaling, wherein the PDCCH search space configuration signaling comprises a PDCCH monitoring periodicity, a PDCCH monitoring offset, and an indication signaling for indicating a starting position of a first symbol in which a PDCCH is located;
wherein the indication signaling for indicating the starting position of the first symbol in which the PDCCH is located acts by using at least one of following manners of indication:
Manner 2: the indication signaling for indicating the starting position of the first symbol in which the PDCCH is located comprises one piece of slot-based second bitmap indication information, and the second bitmap indication information indicates a starting position of a first symbol in which the PDCCH is located in each slot of N consecutive slots, and a first slot in the N consecutive slots meets a predetermined condition; and Manner 3: the indication signaling for indicating the starting position of the first symbol in which the PDCCH is located comprises one piece of third bitmap indication information with a length of 14*N, wherein * represents a multiplication operation, the third bitmap indication information indicates a starting position of a first symbol in which the PDCCH is located in a corresponding slot, and the third bitmap indication information corresponds to N consecutive slots, and a first slot in the N consecutive slots meets a predetermined condition;

the predetermined condition is:

$$(n_f \cdot N_{slot}^{frame,\mu} + n_{s,f}^{\mu} - O) \mod K = 0,$$

wherein $n_f$ is a number of a radio frame in which the first slot is located, $N_{slot}^{frame,\mu}$ is a quantity of slots comprised in one radio frame, $n_{s,f}^{\mu}$ is a slot number of the first slot, u is associated with a subcarrier spacing, N is an integer greater than 1, O is the PDCCH monitoring offset, and K is a quantity of slots comprised in the PDCCH monitoring periodicity.

12. The method according to claim 11, wherein the PDCCH monitoring periodicity comprises at least one quantity of slots among following quantities of slots: 40, 80, 160, 320, 640, and 1280; or the PDCCH monitoring periodicity comprises at least one quantity of slots among following quantities of slots: 5*2u, 10*2u, 20*2u, 40*2u, 80*2u, and 160*2u, wherein * represents a multiplication operation, and u is determined according to a subcarrier spacing.

13. The method according to claim 11, wherein when the PDCCH monitoring periodicity comprises at least one quantity of slots among following quantities of slots: 40, 80, 160, 320, 640, and 1280 or the PDCCH monitoring periodicity comprises at least one quantity of slots among following quantities of slots: 5*2u, 10*2u, 20*2u, 40*2u, 80*2u, and 160*2u, a value range of the PDCCH monitoring offset (O) is 0≤O<M, wherein * represents a multiplication operation, O is an integer, M<K−1, K is a quantity of slots comprised in the PDCCH monitoring periodicity, and u is determined according to a subcarrier spacing.

14. The method according to claim 11, wherein a value range of the PDCCH monitoring offset (O) is determined according to a time domain position candidate value that is determined from a synchronization signal block (SSB) number and master information block (MIB) signaling, or a value range of the PDCCH monitoring offset (O) is determined according to K and u, wherein K is a quantity of slots comprised in the PDCCH monitoring periodicity, and u is determined according to a subcarrier spacing.

15. The method according to claim 11, wherein the PDCCH search space configuration signaling further comprises N consecutive slots representing a PDCCH monitoring duration, and a first slot in the N consecutive slots meets the following condition:

$$(n_f \cdot N_{slot}^{frame,\mu} + n_{s,f}^{\mu} - O) \mod K = 0,$$

wherein $n_f$ is a number of a radio frame in which the first slot is located, $N_{slot}^{frame,\mu}$ is a quantity of slots comprised in one radio frame, $n_{s,f}^{\mu}$ is a slot number of the first slot, u is associated with a subcarrier spacing, N is an integer greater than 1, O is the PDCCH monitoring offset, and K is a quantity of slots comprised in the PDCCH monitoring periodicity.

16. A base station, comprising a processor and a storage storing a computer program, wherein the processor is configured to execute the computer program to implement the method according to claim 11.

* * * * *